(No Model.)
J. C. DENSON & S. B. BELL.
PLOW.
No. 266,274. Patented Oct. 24, 1882.
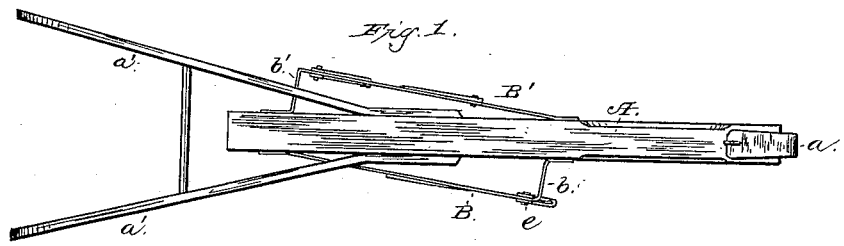
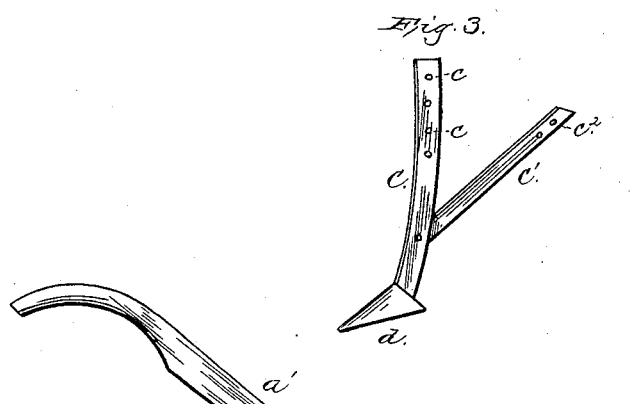
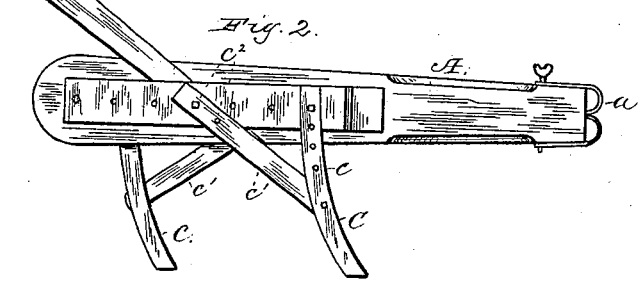
Witnesses:
Inventor:
Jessie C. Denson
Stephen B. Bell
By R. S. & A. P. Lacey
Attorney

UNITED STATES PATENT OFFICE.

JESSIE C. DENSON AND STEPHEN B. BELL, OF IAMONIA, FLORIDA.

PLOW.

SPECIFICATION forming part of Letters Patent No. 266,274, dated October 24, 1882.

Application filed July 31, 1882. (No model.)

*To all whom it may concern:*

Be it known that we, JESSIE C. DENSON and STEPHEN B. BELL, citizens of the United States, residing at Iamonia, in the county of Leon and State of Florida, have invented certain new and useful Improvements in Plows; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in plows and cultivators; and it consists in the construction and arrangement of the several parts, as will be hereinafter fully described, and specifically pointed out in the claim.

In the drawings, Figure 1 is a plan view. Fig. 2 is a side elevation; and Fig. 3 is a detail view, as will be described.

A represents the beam, provided with clevis $a$ at its forward end, and having the handles $a'$ $a'$, as shown.

B B' are the side or standard supporting bars. They are secured on opposite sides of the beam, and are arranged at an angle thereto, as will be described. The bar B is arranged on the right side of the beam. Its rear end is made fast to the beam, near the rear end of the latter, and is extended at an angle to the beam forward, and inclined outward, as shown, and its forward end is connected with the beam by a brace or connection, $b$, which we preferably form by bending the forward end of bar B. The bar B' is arranged on the left side of the beam, and its forward end is secured to the beam at a point in line with and opposite the brace-bar $b$. The bar B' is carried back parallel to bar B, and inclined outwardly from the beam, at an angle thereto, and its rear end is connected therewith by brace-bar $b'$, which extends and is made fast to the beam in line with and opposite the point of connection of the rear end of bar B and the beam. The bar $b'$ is preferably formed by bending the rear end of bar B'. The angles of the bars B and B' with the beam are the same as clearly shown in Fig. 1.

$b^2$ represents a series of adjusting-holes through the bars B B'.

C represents the standards, composed preferably of two bars secured together, or of one bar having its upper portion bifurcated to permit the brace hereinafter described to be passed to front or rear thereof, as will be described. It is provided with a series of adjusting-holes, $c$.

$c'$ represents a brace, having one end pivoted to the standard and its opposite end provided with a series of adjusting-holes, $c^2$.

$d$ represents the cultivator shovel or plow, secured on lower end of the standard.

$e$ represents bolts or pins, whereby the standards C and brace $c'$ are secured to the bars B B' through the coincident ones of the series of holes $c$ $c^2$ $b^2$. The braces $c'$ may be extended to front or rear of the standards C, according as the standards are secured near the rear or forward ends of the bars B B', as shown in Fig. 2. The bars B B', it will be seen, are arranged on opposite sides of the beam, with their adjacent ends arranged, the one close to the side of the beam and the other on the opposite side of the beam, supported off to one side, as shown. Thus by adjusting the standards to the forward end of the bar B and to the rear end of the bar B' they are held wide apart, and by reversing this adjustment and securing them, the one to the forward end of bar B' and the other to the rear end of bar B, they are made to run close together, and by adjusting them along the opposite bars they may be made to run at any suitable width desired and one in rear of the other, in ordinary cultivator style, with a central draft, as shown, and will be readily understood on reference to the drawings and the description hereinbefore given.

Having thus described our invention, what we claim, and desire to secure by Letters Patent, is—

The combination, substantially as set forth, of the beam A and the bars B B', arranged on opposite sides of the beam A, and parallel to each other and at an angle to the said beam, and having their adjacent ends secured, the one close to the beam A and the other off to one side thereof, and adapted to carry the standard C, as and for the purpose described.

In testimony whereof we affix our signatures in presence of two witnesses.

JESSIE CHAPMAN DENSON.
STEPHEN B. BELL.

Witnesses:
JNO. A. CRAIG,
EDWD. M. WEST.